Nov. 4, 1969     H. J. GRIEB     3,476,334
TURBO-DRIVE FOR HIGH VELOCITY HELICOPTERS
Filed Oct. 26, 1966
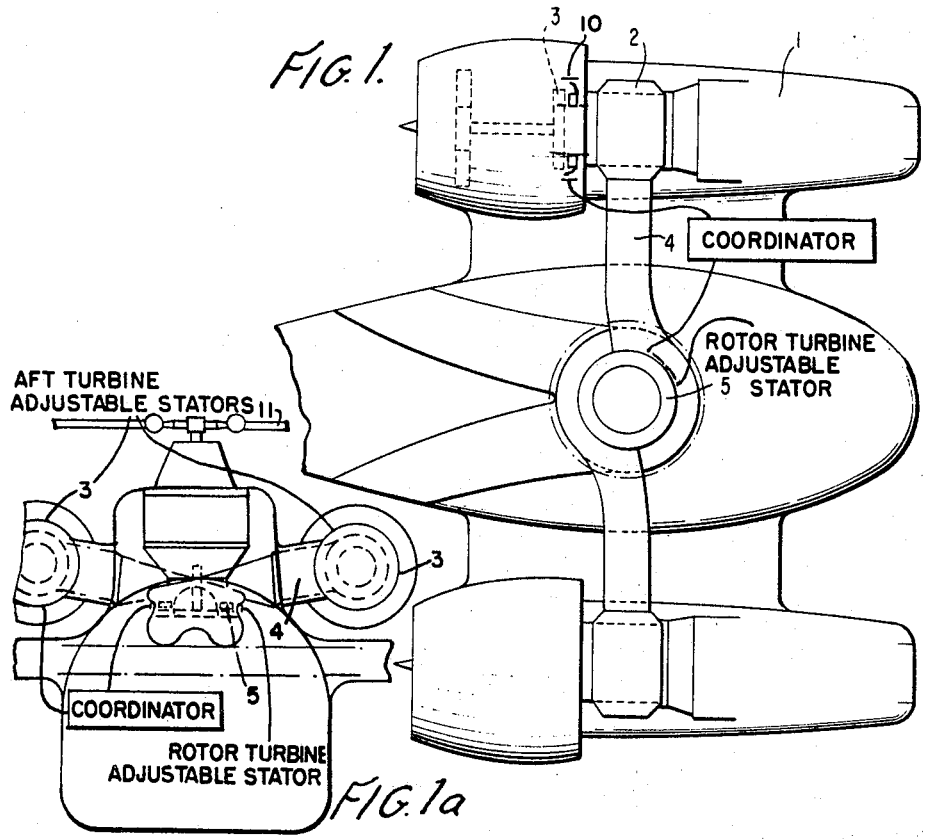
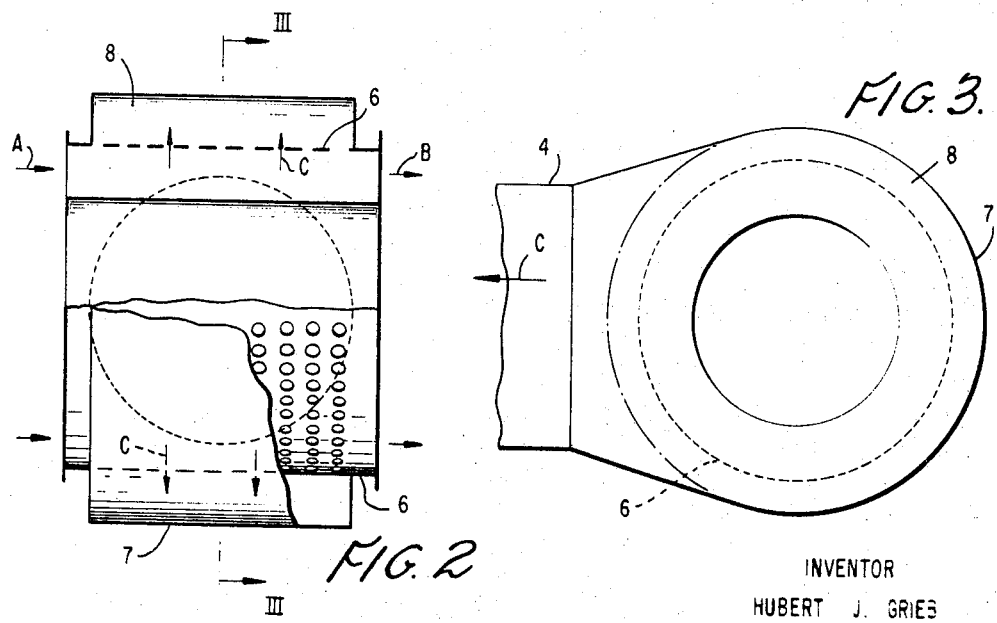
INVENTOR
HUBERT J. GRIEB
BY *Dicke & Craig*
ATTORNEYS

United States Patent Office 3,476,334
Patented Nov. 4, 1969

3,476,334
TURBO-DRIVE FOR HIGH VELOCITY HELICOPTERS
Hubert J. Grieb, Stuttgart-Botnang, Germany, assignor to Daimler-Benz Aktiengesellschaft, Stuttgart-Unterturkheim, Germany
Filed Oct. 26, 1966, Ser. No. 589,601
Claims priority, application Germany, Oct. 27, 1965, D 48,523
Int. Cl. B64c 27/82
U.S. Cl. 244—17.19
4 Claims

ABSTRACT OF THE DISCLOSURE

A turbo-drive arrangement of high-speed helicopters having a common drive unit for supplying both lift and thrust forces, including one or more gas generators with associated turbines for providing thrust, lift rotor means and an associated turbine for providing lift, each of the turbines having adjustable guide means for selectively varying the flow cross-section thereof, and a chamber interposed between the gas generators and the turbines for selectively dividing the output of the generators between the thrust turbines and the lift turbine.

---

The present invention relates to a propulsion unit for helicopters, and more particularly to a turbo-drive for high-speed helicopters.

High-speed helicopters require within the range of high velocities a special propulsion as well as lifting surfaces or wings because the rotational speed of the helicopter rotor and therewith the lift attainable by means of the rotor has to be reduced in consideration of the approach flow Mach numbers of the rotor blades. The propulsion can be realized by means of open or jacketed propellers, mechanically driven compressors or jets, or jet turbines.

For reasons of weight, it is appropriate to utilize the same drive aggregates or units for lift and thrust. However, there arises the problem of the distribution of the drive power or propulsion output prescribed by the flight condition to the left rotor and to the propulsion element. Whereas with vertical starting and landing, the entire power output minus the moment equalization has to be supplied to the lift rotor, the lift rotor requires during fast flight only a small fraction of its maximum output whereas the main portion of the available power goes to the propulsion elements.

The input power of the lift rotor, in addition of being dependent on the angular position of the rotor blades and the flight velocity is dependent, especially on the rotor rotational speed. The same is true for an adjustable pitch propeller as propulsion element. With a compressor utilized as propulsion element and having an adjustable inlet guide wheel, the input power can be influenced also only within small limits by the adjustment of the guide wheel.

A distribution of the power which can be influenced by mechanical means within wide limits, therefore requires variable transmission ratios of the main transmission. Even with several transmission ratios or steps the distribution of the output power can be realized only in an incomplete manner. Furthermore, the available power can be utilized completely only within certain operating ranges.

Therebeyond, the necessity to provide shifting steps signifies a considerable expenditure with the normally large power to be transmitted.

Accordingly, it is proposed in accordance with the present invention to eliminate these shortcomings in that there is provided between the gas generator and the working turbine of the propulsion unit a removal or bleeder chamber which together with the adjustable guide wheel of the working turbine permits to conduct the gas supplied by the gas generator either directly to the working turbine or laterally to a special working turbine—also provided with adjustable guide means—which drives by way of a change-speed transmission the lift rotor.

The removal of bleeder chamber consists in principle of the apertured outer wall of the flow channel between the gas generator and the working turbine which is surrounded by a housing that terminates in or discharges into the conduit laterally leading to the rotor turbine. The removal or bleeder chamber operates automatically, contains no movable parts and causes only slight pressure losses.

The guide apparatus of the work turbines of the propulsion unit, on the one hand, as well as of the turbine of the lift rotor, on the other, have to be so adjusted that the over-all cross section of this nozzle system remains constant. With such an arrangement, the power output can be distributed at will and without steps to the lift rotor and to the propusion aggregates or units. Propeller-turbine-propulsion units with puller-type or pusher-type propellers, free or jacketed as well as two-circuit jet propulsion units either in front- or aft-fan construction may be used as propusion units in accordance with the present invention. Since such propulsion units are known per se and form no part of the present invention, a detailed description thereof is dispensed with herein.

The arrangement as proposed in accordance with the present invention limits the expenditure for the main transmission, in the form of a simple co-axial speed-reduction gear, to a minimum. The structural height of the rotor drive is small which is favorable as regards the storage space of the helicopter.

Accordingly, is is an object of the present invention to provide a turbo-drive for high velocity helicopters which eliminates by extremely simple means and in an extraordinarily effective manner the shortcomings and drawbacks encountered in the prior art constructions.

Another object of the present invention resides in a turbo-drive for high velocity helicopters and the like which permits by simple means, a selective distribution of the power output of the gas generators either to the lift rotor or to the propusion units.

A further object of the present invention resides in a turbo-drive for high velocity helicopters in which the same drive units are utilized for lift and thrust, thereby reducing the weight of the helicopter while at the same time increasing the available space for pay-load.

Another object of the present invention resides in a turbo-drive for helicopters and the like of the type described above in which the selective distribution of the power output of the drive unit or units can be influenced within wide limits.

Still a further object of the present invention resides in a turbo-drive unit for high velocity helicopters and the like which includes a selectively operable distribution means for the output thereof characterized by simplicity, small weight, and slight space requirements while assuring at the same time complete utilization of all the available output in all operating ranges.

Another object of the present invention resides in a distribution system for the output of the drive unit to the lift and propulsion means of a helicopter which operates completely automatically, contains no movable parts and causes only slight pressure losses.

These and further objects, features, and advantages of the present invention will become more obvious from the following description when taken in connection with the accompanying drawing which shows, for purposes of illustration only, one embodiment in accordance with the present invention, and wherein:

FIGURE 1 is a schematic plan view on the drive or propulsion system of a helicopter in accordance with the present invention, shown partially in cross section.

FIGURE 1A is a schematic elevational view of the drive or propulsion system of a helicopter in accordance with the present invention;

FIGURE 2 is a longitudinal cross-sectional view through the removal or bleeder chamber in accordance with the present invention; and FIGURE 3 is a cross-sectional view, taken along line III—III of FIGURE 2.

Referring now to the drawing wherein like reference numerals are used to designate like parts throughout the various views, and more particularly to FIGURE 1 which illustrates in plan view the drive or propulsion system of a high velocity helicopter, the gas generator of any conentional construction is designated therein by reference numeral 1 while the removal or bleeder chamber in accordance with the present invention is generally designated therein by reference numeral 2. Reference numeral 3 designates in FIGURE 1 the work turbine of the propulsion unit of conventional construction which is provided with a conventional adjustable guide means 10 for example in the form of an adjustable guide wheel or wheels. Since the gas generator 1 as well as the turbine 3 and its guide means are known in the prior art and form no part of the present invention, a detailed description thereof is dispensed with herein. The removing or bleeder chamber 2 is connected by way of a channel or conduit 4 with the work turbine 5 of the rotor drive which work turbine 5 is also of conventional construction and is provided with a conventional guide means. The removing or bleeder chamber 2 consists of an aperture pipe or tubular member 6 (FIGURE 2) which is surrounded by a tubular jacket 7. The channel 4 leading to the working turbine 5 of the lift rotor 11 branches off from the tubular jacket 7. The gas coming from the gas generator 1 is able to flow through the apertured pipe 6 into the annular space 8 and from the latter through the conduit 4 to the work turbine 5 of the lift rotor 11.

Of the various arrows shown in FIGURES 2 and 3, arrows A indicate the direction of the gases flowing from the gas generator 1 into the removing or bleeder chamber 2, arrows B the direction of the gases to the work turbine 3 of the propulsion unit and arrows C the direction of the gases to the work turbine 5 of the rotor drive.

The problem of moment equalization for the lift rotor is not affected by the present invention. The moment equalization can take place in any conventional manner, for example, mechanically by way of the main transmission, e.g. by means of a rear rotor, or also aerodynamically by removal of gas from the connecting lines between the gas generator and rotor turbine. Thus, the choice between a rear nozzle and a turbo-driven rear engine remains as before.

The ability on the part of the pilot to influence the distribution of the output may be limited with a given position of the gas pedal or stick to the choice or selection of the rotational speed of the lift rotor. This influence can also be rendered completely automatic, for example, in that the maximum rotational speed of the lift rotor is automatically adjusted by conventional means in an optimum manner in dependence on the flight velocity. As a result thereof, the operation of the lift rotor, according to the present invention, is reduced completely to that of conventional helicopters.

With aircraft having several propulsion or drive units, the turbine of the lift rotor is loaded in such a manner by a corresponding configuration of the inlet portion thereof that in case of failure or break-down of one propulsion unit, no back flow can occur from the intact propulsion units into the shut-off propulsion unit. A damage in one propulsion unit thus cannot become effective in a disturbing manner on the over-all installation. If the adjustment of a turbine fails, then it is possible without danger to continue the flight corresponding to the output distribution determined thereby. In the extreme case that this failure occurs during rapid or high-velocity flights, i.e. with a small rotor output, the landing can take place in autorotational flight.

The adjustable guide apparatus, such as adjustable guide wheels of the work turbines of the propulsion unit or units and of the lift rotor are so coupled with each other by conventional, mechanical, hydraulic or electric coordinating means that with the adjustment thereof, the sum of the flow or passage cross section remains constant. Since such interconnections are well known to a person skilled in the art, a detailed description thereof is also dispensed with herein.

While I have shown and described one embodiment in accordance with the present invention, it is understood that the same is not limited thereto but is susceptible of numerous changes and modifications as known to a person skilled in the art, and I therefore do not wish to be limited to the details as shown and disclosed herein, but intend to cover all such changes and modifications as are encompassed by the scope of the appended claims.

I claim:

1. A turbo-drive for high velocity helicopters, having common gas generator means used for both lift and thrust, comprising propulsion unit means including first work turbine means, lift rotor means, second work turbine means for said lift rotor means, said first and second work turbine means being provided with adjustable guide means, means for selectively dividing the power output from said gas generator means to said first and second work turbine means, including chamber means arranged between said gas generator means and said first work turbine means and channel means leading from said chamber means to said second work turbine means, and means operatively connecting the adjustable guide means of each of said work turbine means for maintaining a substantially constant total flow.

2. A turbo-drive according to claim 1, wherein said chamber means includes an apertured tubular member, a tubular jacket surrounding said tubular member, thus defining an annular space therebetween, said channel means communicating with said annular space.

3. In a turbo-drive for high velocity helicopters having a common gas generator used for both lift and thrust, a propulsion unit including first work turbine means, a lift rotor means and second work turbine means for rotating the lift rotor, each of said work turbine means being provided with adjustable guide means, the improvement comprising means for selectively dividing the power output from said gas generator to each of said work turbine means, by selectively dividing the gas output from said gas generator to one or the other of said work turbine means, and means operatively connecting the adjustable guide means of each of said work turbine means for maintaining a substantially constant total flow.

4. The improvement according to claim 3, further comprising chamber means between said gas generating means and said first work turbine means and including an apertured tubular member, a tubular jacket surrounding said tubular member, thus defining an annular space therebetween, and channel means communicating with said annular space and leading to said second work turbine means.

References Cited

UNITED STATES PATENTS

| | | | |
|---|---|---|---|
| 1,385,401 | 7/1921 | Stockholder | 251—345 XR |
| 2,455,458 | 12/1948 | Whittle | 60—39.16 XR |
| 2,505,796 | 5/1950 | Sedille | 60—39.16 XR |
| 2,650,666 | 9/1953 | Dorand et al. | |
| 2,654,993 | 10/1953 | Owner | 60—39.16 |
| 2,939,649 | 6/1960 | Shaw | 244—12 |
| 3,073,114 | 1/1963 | Wood | 60—39.25 |
| 3,179,353 | 4/1965 | Peterson | 244—12 |
| 3,308,618 | 3/1967 | Jubb et al. | 60—39.16 XR |
| 3,332,242 | 7/1967 | Johnson | 60—39.16 XR |

CARLTON R. CROYLE, Primary Examiner

U.S. Cl. X.R.

60—39.15, 39.25, 224